(12) United States Patent
Reed et al.

(10) Patent No.: US 10,435,316 B2
(45) Date of Patent: Oct. 8, 2019

(54) CHEMICAL OPTIMIZATION DURING WASTEWATER TREATMENT, ODOR CONTROL AND USES THEREOF

(75) Inventors: Brian Reed, Huntington Beach, CA (US); Carla Dillon, Costa Mesa, CA (US)

(73) Assignee: Orange County Sanitation District, Fountain Valley, CA (US)

( * ) Notice: Subject to any disclaimer, the term of this patent is extended or adjusted under 35 U.S.C. 154(b) by 0 days.

(21) Appl. No.: 13/247,138

(22) Filed: Sep. 28, 2011

(65) Prior Publication Data

US 2012/0141407 A1  Jun. 7, 2012

Related U.S. Application Data

(60) Provisional application No. 61/388,426, filed on Sep. 30, 2010.

(51) Int. Cl.
| | | |
|---|---|---|
| C02F 1/52 | (2006.01) | |
| C02F 1/66 | (2006.01) | |
| C02F 1/72 | (2006.01) | |
| C02F 101/10 | (2006.01) | |

(52) U.S. Cl.
CPC .............. *C02F 1/5245* (2013.01); *C02F 1/66* (2013.01); *C02F 1/722* (2013.01); *C02F 2101/101* (2013.01); *C02F 2303/02* (2013.01); *C02F 2307/08* (2013.01)

(58) Field of Classification Search
CPC combination set(s) only.
See application file for complete search history.

(56) References Cited

U.S. PATENT DOCUMENTS

| | | |
|---|---|---|
| 1,757,526 A | 5/1930 | Hedgepeth |
| 1,956,420 A | 4/1934 | Gleason et al. |
| 2,116,053 A | 5/1938 | Urbain et al. |
| 2,129,267 A | 9/1938 | Fischer |
| 2,171,203 A | 8/1939 | Urbain et al. |
| 3,173,863 A | 3/1965 | Oster |
| 3,300,404 A | 1/1967 | Howe et al. |
| 3,522,173 A | 7/1970 | Lindman et al. |
| 3,948,774 A | 4/1976 | Lindman |
| 3,966,450 A | 6/1976 | O'Neill et al. |
| 4,008,775 A | 2/1977 | Fox |
| 4,108,771 A | 8/1978 | Weiss |
| 4,123,355 A | 10/1978 | Frosch et al. |
| 4,344,842 A | 8/1982 | Fox |
| 4,366,131 A | 12/1982 | Fox |
| 4,446,031 A | 5/1984 | List |
| 4,476,027 A | 10/1984 | Fox |
| 4,501,668 A | 2/1985 | Merk et al. |
| 4,541,986 A | 9/1985 | Schwab et al. |
| 4,612,124 A | 9/1986 | Escrig |
| 4,680,127 A | 7/1987 | Edmondson |
| 4,681,687 A | 7/1987 | Mouche et al. |
| 4,705,638 A | 11/1987 | Ganczarczyk |
| 4,902,408 A | 2/1990 | Reichert et al. |
| 4,911,843 A | 3/1990 | Hunniford et al. |
| 4,956,160 A | 9/1990 | Reichert |
| 5,141,647 A | 8/1992 | Bhadra |
| 5,200,092 A | 4/1993 | Richards et al. |
| 5,228,995 A | 7/1993 | Stover |
| 5,286,389 A | 2/1994 | Hardison |
| 5,292,440 A | 3/1994 | Hardison |
| 5,336,431 A | 8/1994 | Richards et al. |
| 5,350,516 A | 9/1994 | Bhadra |
| 5,614,102 A | 3/1997 | Sakurada |
| 5,948,269 A | 9/1999 | Stone |
| 6,428,701 B1 | 8/2002 | Mullennix et al. |
| 7,087,172 B2 | 8/2006 | Hunniford et al. |
| 7,138,049 B2 | 11/2006 | Hunniford et al. |
| 7,186,341 B2 | 3/2007 | Hunniford et al. |
| 7,198,661 B2 | 4/2007 | Tupper |
| 7,285,207 B2 | 10/2007 | Hunniford et al. |
| 7,326,340 B2 | 2/2008 | Harshman et al. |
| 7,553,420 B2 | 6/2009 | Simpson et al. |
| 7,744,841 B2 | 6/2010 | Farha |
| 7,799,215 B2 | 9/2010 | Matheis et al. |
| 7,799,224 B2 | 9/2010 | Matheis et al. |
| 7,931,815 B2 | 4/2011 | Farha et al. |
| 7,943,105 B2 | 5/2011 | Farha |
| 7,972,532 B2 | 7/2011 | Simpson et al. |
| 2002/0115899 A1* | 8/2002 | Stanforth ............ 588/236 |
| 2008/0296232 A1* | 12/2008 | Wegner ............ C02F 1/5245 |

OTHER PUBLICATIONS

Nielsen et al., Water Research 39 (2005) 2747-2755.*

* cited by examiner

*Primary Examiner* — Robert S Cabral
(74) *Attorney, Agent, or Firm* — Sandra Thompson; Finlayson Toffer Roosevelt & Lilly LLP

(57) ABSTRACT

Compositions for the use of sewage or wastewater treatment, controlling odors or a combination thereof are disclosed, wherein the composition comprises at least one iron-based compound. Furthermore, methods of reducing the odors in a sewage or wastewater system are disclosed that include: adding a composition comprising at least one iron-based compound to a sewage or wastewater system. As used herein, the phrase "at least one iron-based compound" includes ferrous chloride, ferric chloride, ferrous sulfate, ferrate, polyferric sulfate, Ferix-3 ($Fe_2(SO_4)3H_2O$) or a combination thereof.

9 Claims, 13 Drawing Sheets

Effect of pH on Sulfide

Effect of pH Changes on Vapor Hydrogen Sulfide, Miller Holder

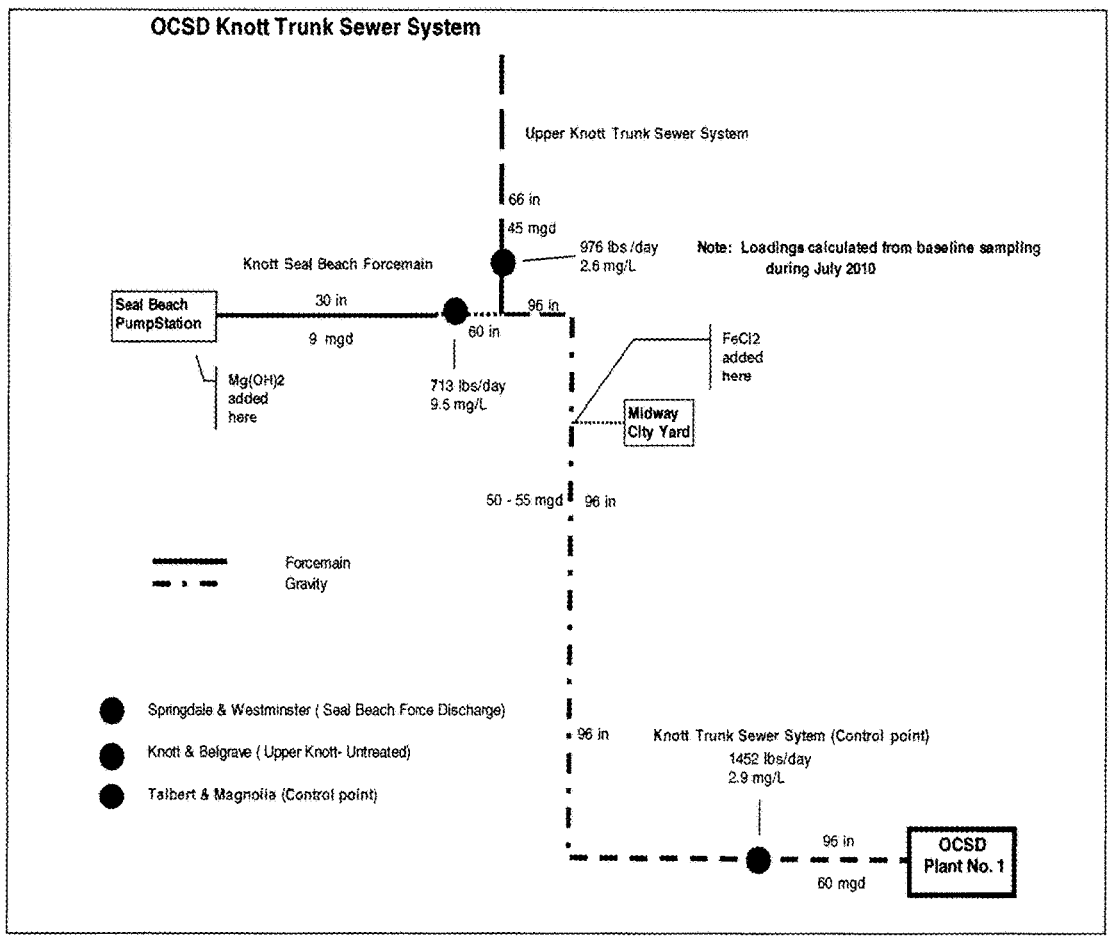
Figure 3: OCSD Knott Interceptor (Simplified Schematic)

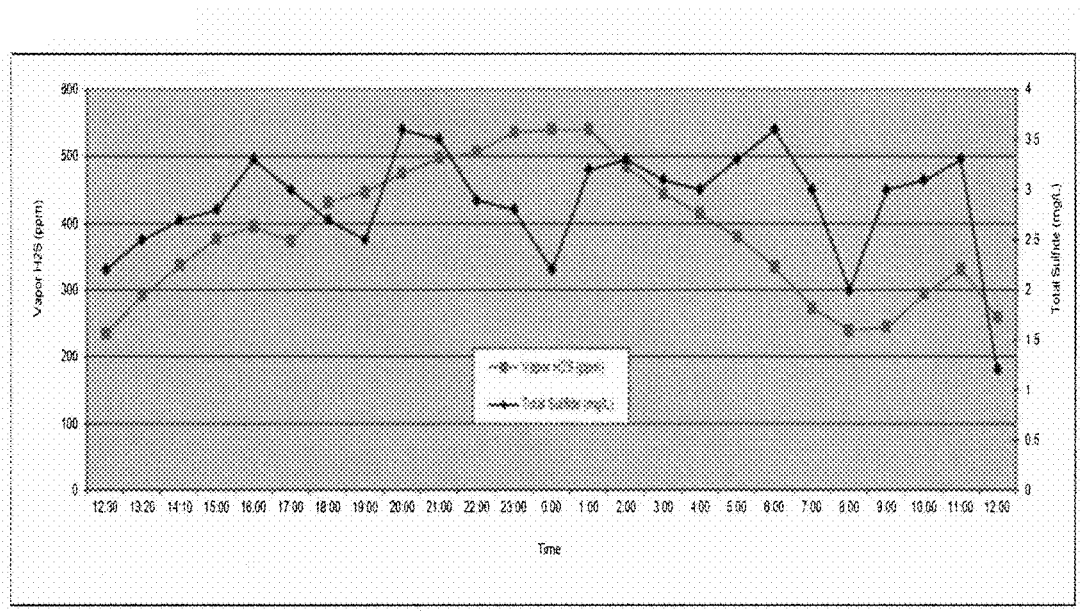
Figure 4: Knott Trunk Sewer Baseline H₂S

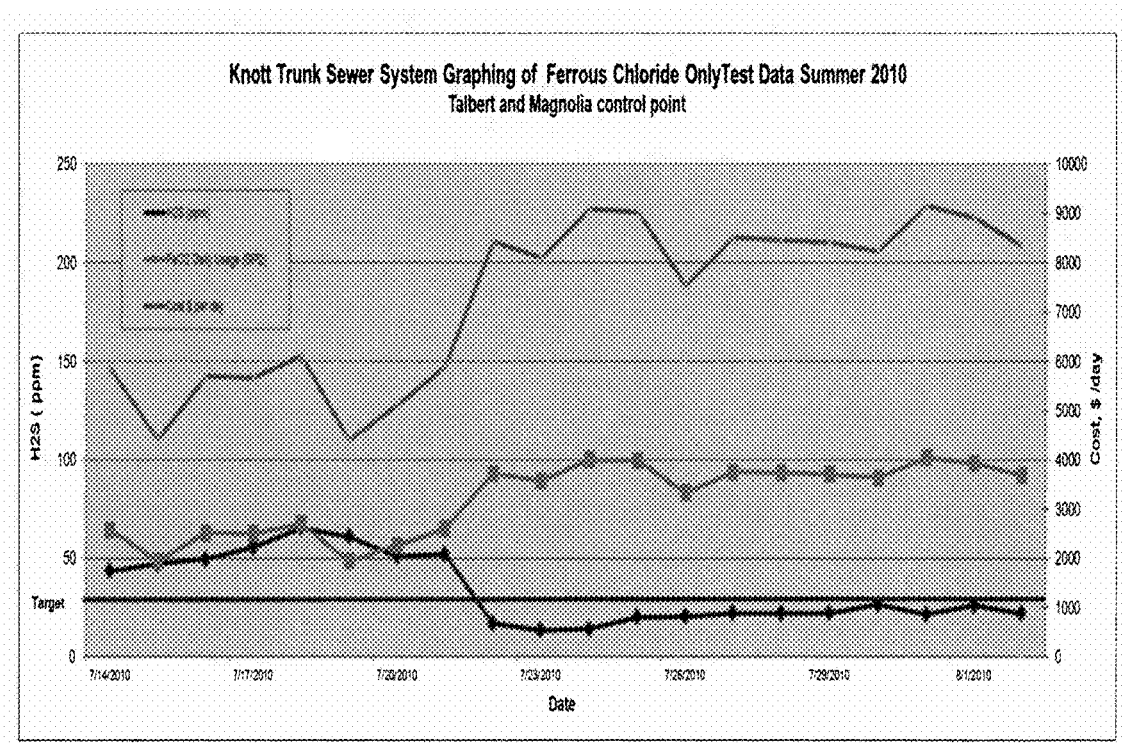
Figure 5: Hydrogen Sulfide and Cost With FeCl₂ (summer baseline) Chemical Feed

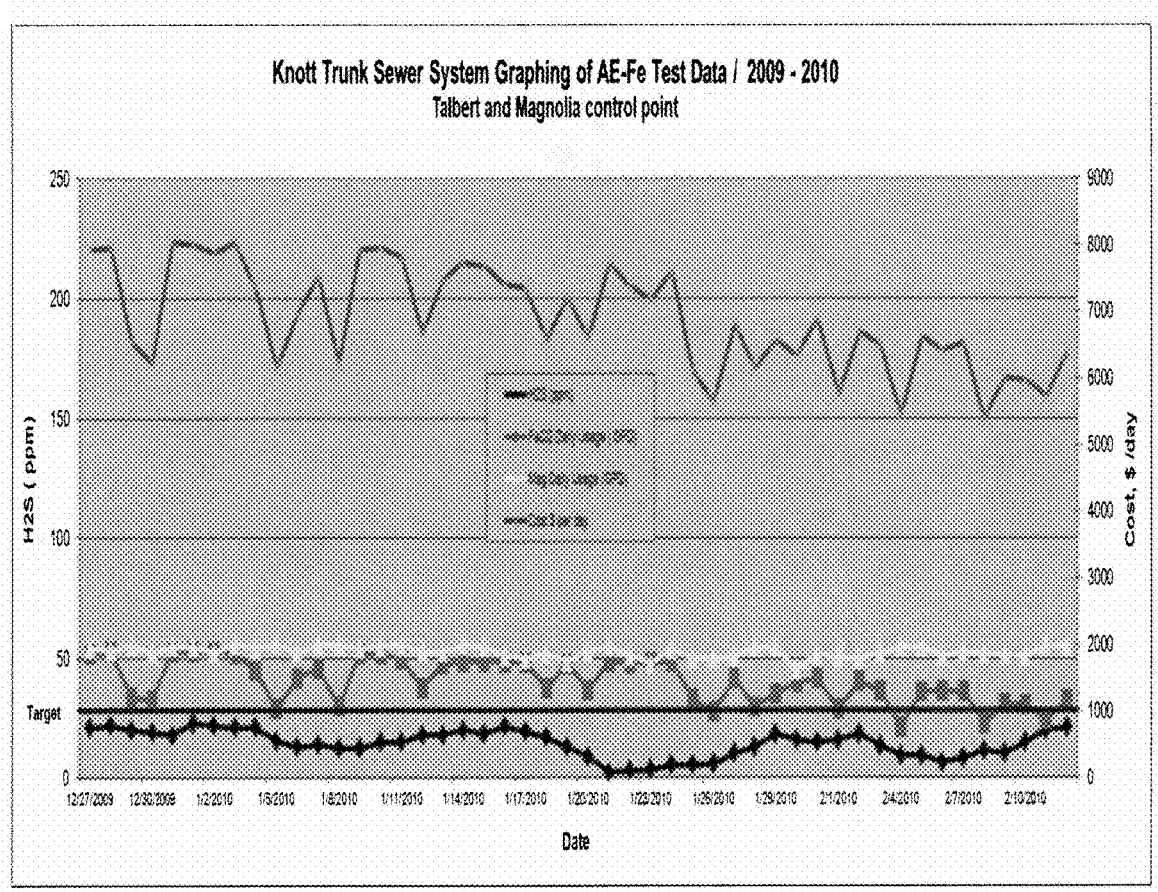
Figure 6: Hydrogen Sulfide and Cost With AE-Fe Technology

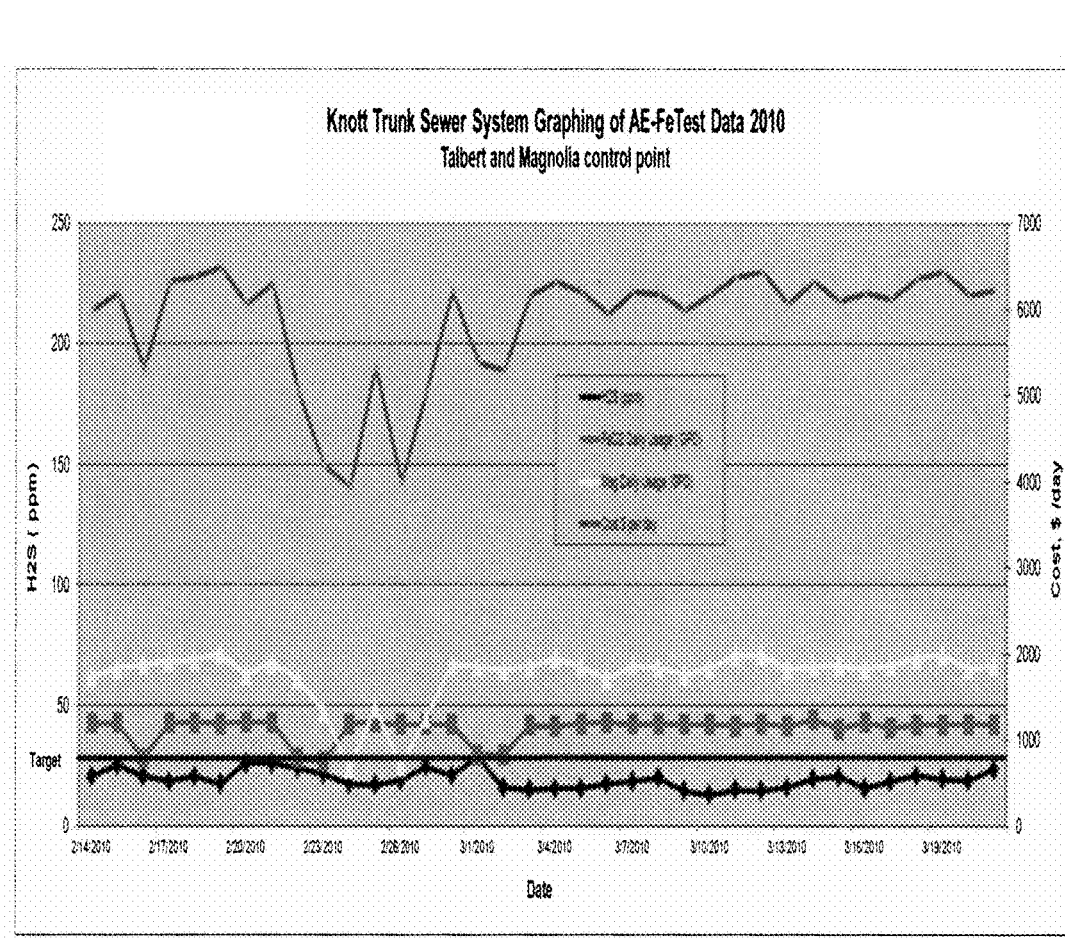
Figure 7: Hydrogen Sulfide and Cost With AE-Fe Technology

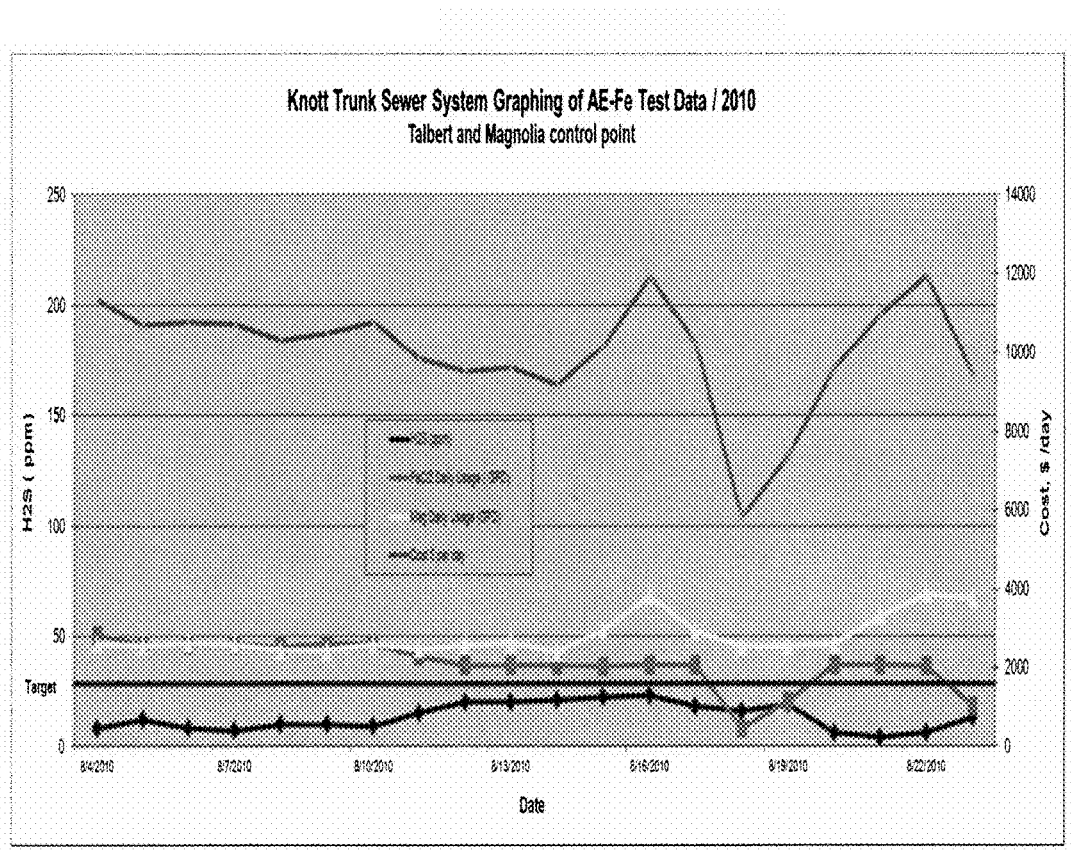
Figure 8: Hydrogen Sulfide and Cost With AE-Fe Technology

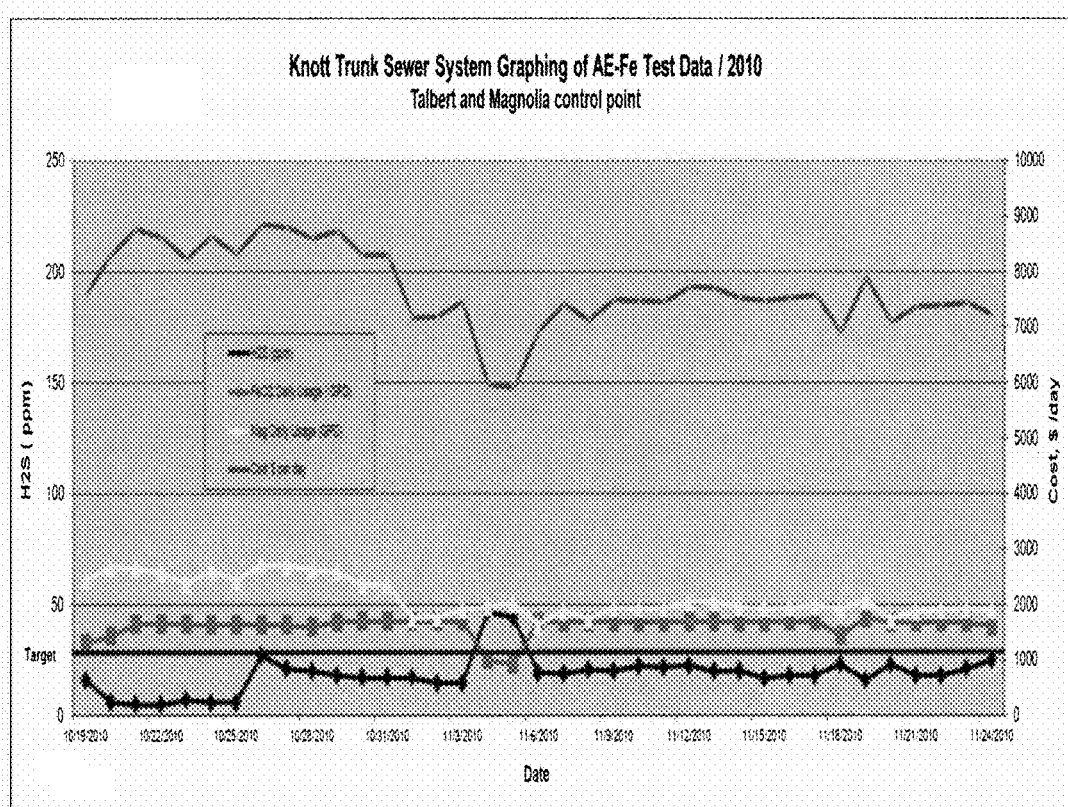
Figure 9: Hydrogen Sulfide and Cost With AE-Fe Technology

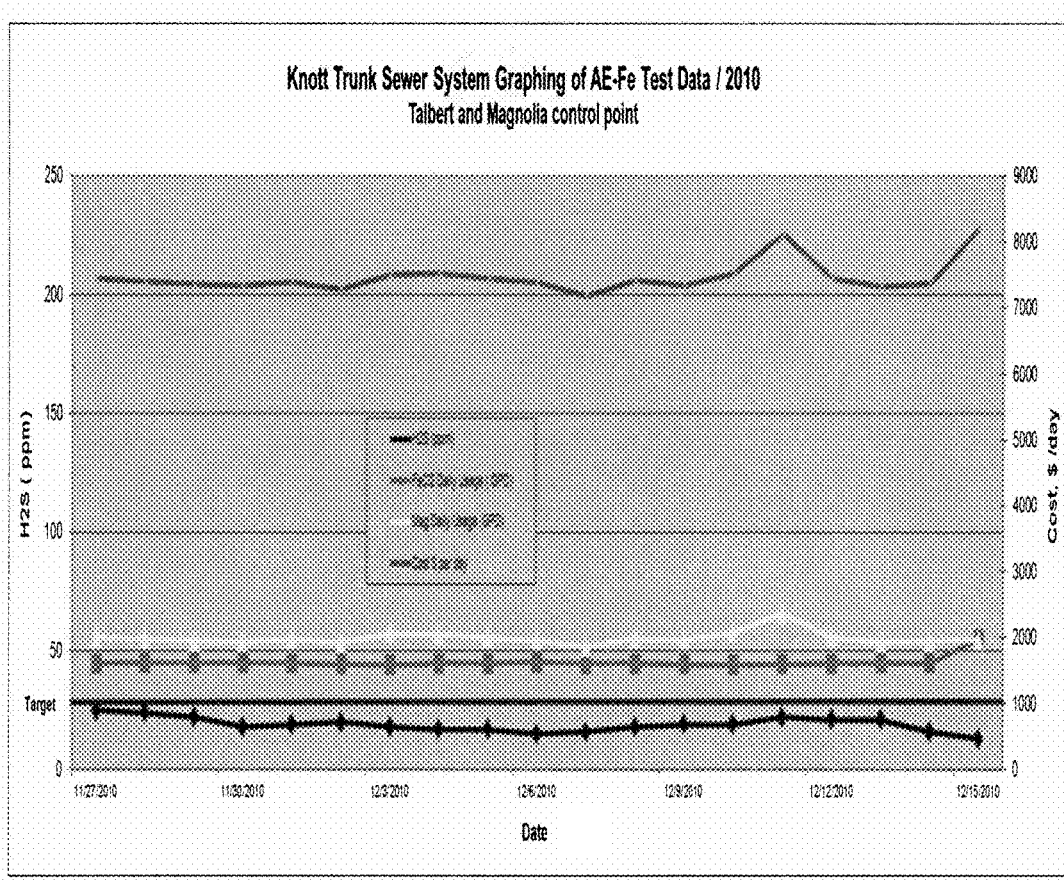
Figure 10: Hydrogen Sulfide and Cost With AE-Fe Technology

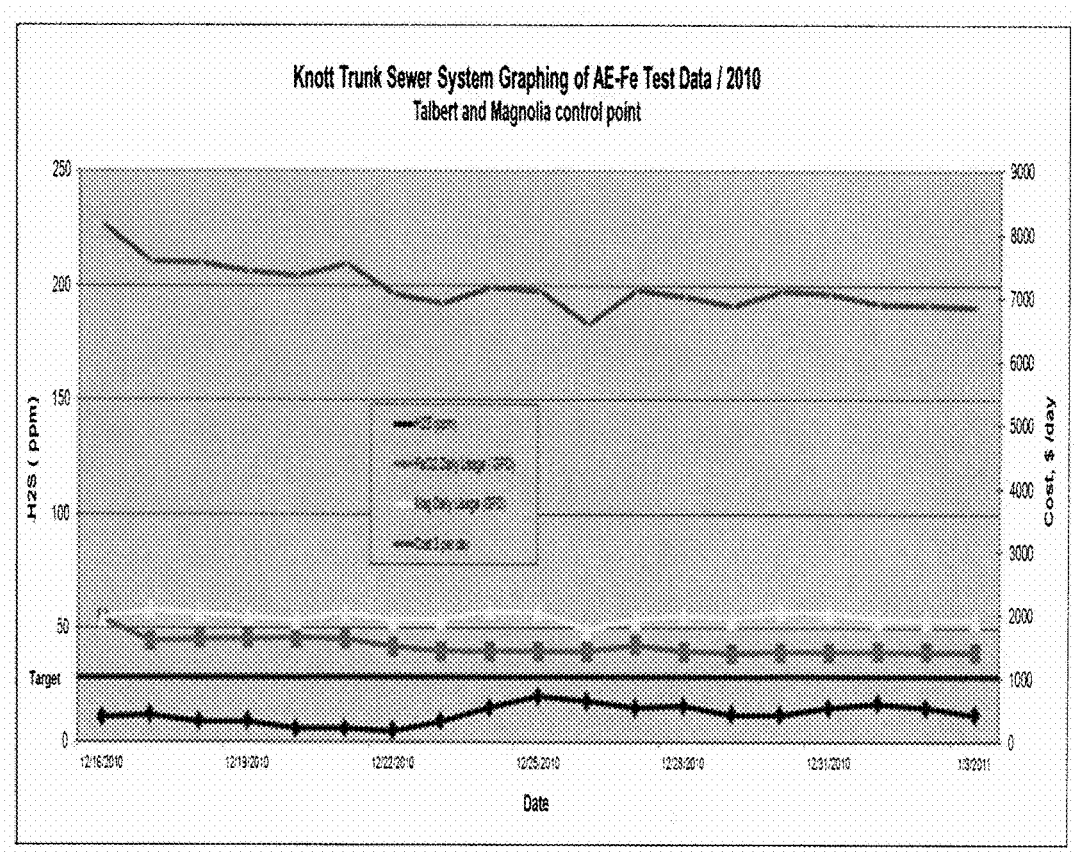
Figure 11: Hydrogen Sulfide and Cost With AE-Fe Technology

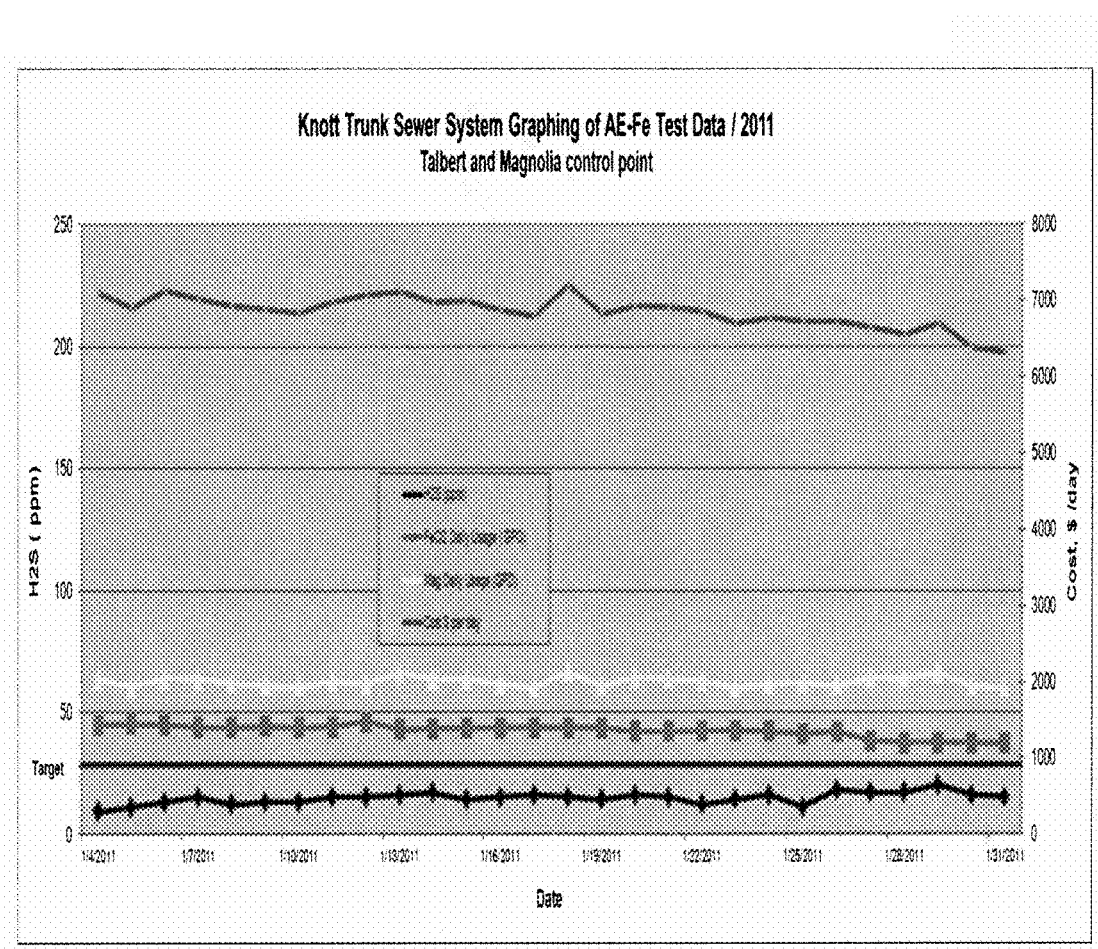
Figure 12: Hydrogen Sulfide and Cost With AE-Fe Technology

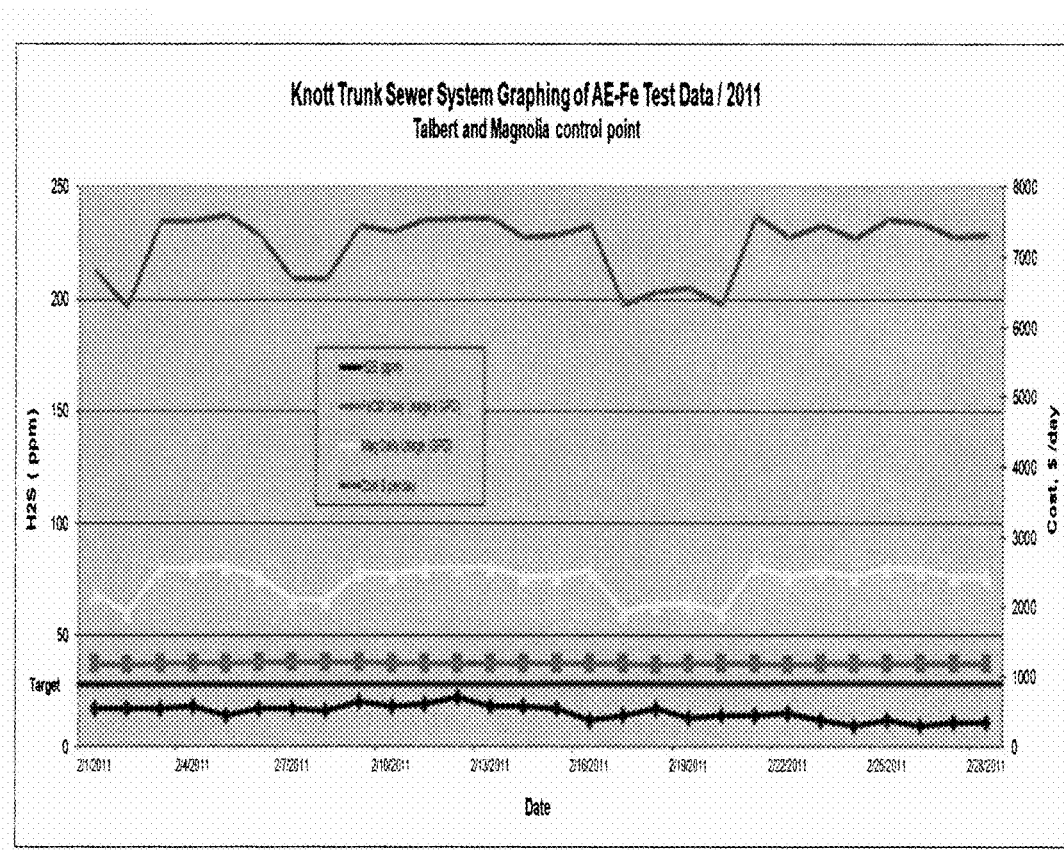
Figure 13: Hydrogen Sulfide and Cost With AE-Fe Technology

CHEMICAL OPTIMIZATION DURING WASTEWATER TREATMENT, ODOR CONTROL AND USES THEREOF

This application claims priority to U.S. Provisional Application Ser. No. 61/388,426 filed on Sep. 30, 2010, which is commonly-owned and incorporated herein in its entirety by reference.

FIELD OF THE SUBJECT MATTER

The field of the subject matter is wastewater treatment, wastewater treatment optimization and odor control.

BACKGROUND

Large sewage and wastewater treatment plants and sanitation facilities have to meet the needs of large and complex communities, while at the same time sanitizing an enormous amount of solid, slurry and liquid waste in order to provide drinkable water, along with other reusable components, such as heat/energy and solid biomass. From a practical perspective, these facilities also have to contend with price fluctuations and availability of chemicals, in that they cannot afford to change chemicals on the fly given that their purpose is to provide safe and clean drinking water to a community and not necessarily experiment with each and every chemical combination.

In most instances, it is also necessary to simplify the chemical introductions into a sewage or wastewater systems, such that employees are not concerned with transporting chemicals to different locations and/or concerned with adding different chemicals or different amounts of chemicals at different points in the process. This simplification is, again, practical for mid to large size wastewater and sewage treatment plants.

To add a layer of complexity to the overall process, the sewage and wastewater characteristics and flow profile in any given trunkline are continuously changing due in part to water conservation measures, drought conditions, diversions to increase flow for the groundwater replenishment system, a reduction in industrial dischargers in the service area, and complexities of the sewer shed. In addition to changing wastewater conditions, the odors and hydrogen sulfide generation have also changed.

To this end, it would be desirable to use a composition that can a) reduce the odor-causing components of a sewage or wastewater system; b) reduce the need for multiple chemical combinations at multiple loading points within the sewage or wastewater system; c) address acquisition and storage issues of chemical constituents utilized for wastewater and sewage treatment and d) simplify the overall process.

SUMMARY OF THE SUBJECT MATTER

Compositions for the use of sewage or wastewater treatment are disclosed, wherein the composition comprises at least one iron-based compound.

Furthermore, methods of reducing the odors in a sewage or wastewater system are disclosed that include: adding a composition comprising at least one iron-based compound to a sewage or wastewater system.

As used herein, the phrase "at least one iron-based compound" includes ferrous chloride, ferric chloride, ferrous sulfate, ferrate, polyferric sulfate, ferix-3 ($Fe_2(SO_4)3H_2O$) or a combination thereof.

Figure 2:
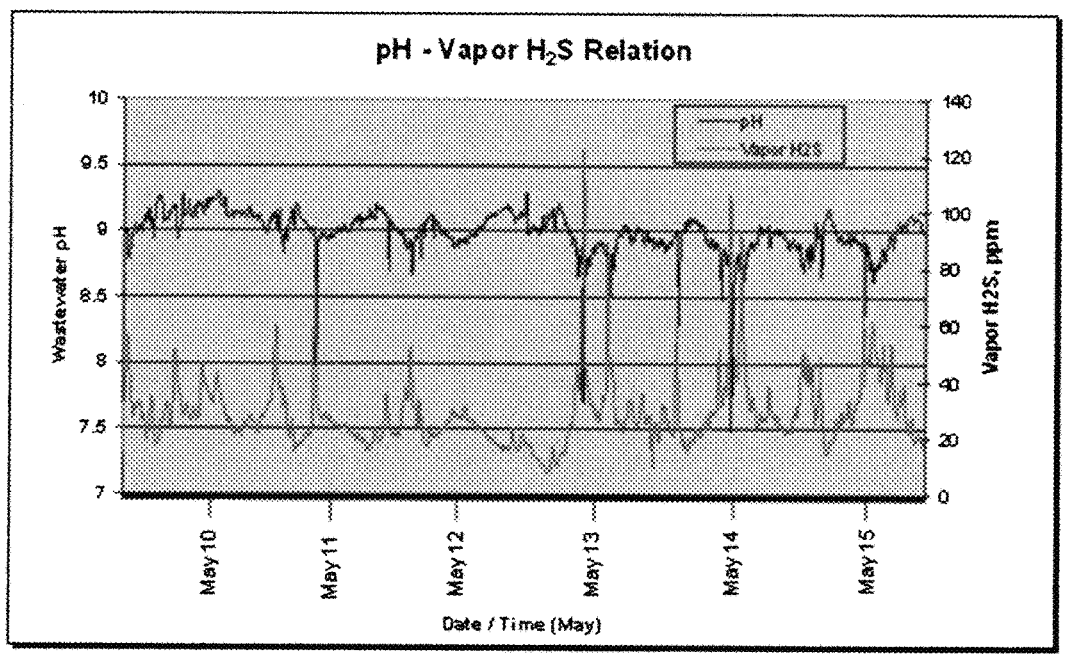

During the test period with magnesium hydroxide, several pH dips occurred. Specifically, ten over a six-day period were observed and are shown in FIG. 2.

The portion of the Knott Trunk Sewer System tested is shown in FIG. 3.

FIG. 4 presents the baseline sulfide levels (without chemical treatment) along the Knott Trunk Sewer System, and aqueous and vapor sulfide levels measured at the downstream control point Talbert and Magnolia.

FIG. 5 shows the baseline level of treatment provided by $FeCl_2$-alone, and the average dose for the period was 4,050 gpd.

FIGS. 6-13 present data for various sampling periods during a continuous fifteen month period.

DETAILED DESCRIPTION

Compositions are disclosed herein that a) reduce the odor-causing components of a sewage or wastewater system; b) reduce the need for multiple chemical combinations at multiple loading points within the sewage or wastewater system; c) address acquisition and storage issues of chemical constituents utilized for wastewater and sewage treatment and d) simplify the overall process.

Compositions for the use of sewage or wastewater treatment are disclosed, wherein the composition comprises at least one iron-based compound. Furthermore, methods of reducing the odors in a sewage or wastewater system are disclosed that include: adding a composition comprising at least one iron-based compound to a sewage or wastewater system. As used herein, the phrase "at least one iron-based compound" includes ferrous chloride, ferric chloride, ferrous sulfate, ferrate, polyferric sulfate, Ferix-3 ($Fe_2(SO_4)_3$ $H_2O$) or a combination thereof.

Contemplated embodiments begin with an understanding that iron-based compounds and iron salts, such as ferrous chloride, ferric chloride, ferrous sulfate, ferrate, polyferric sulfate, Ferix-3 ($Fe_2(SO_4)_3H_2O$) or a combination thereof can be utilized on their own to reduce and control odor-causing components of a sewage and/or wastewater system.

In some embodiments, at least one alkaline component can be added to the at least one iron-based compound, iron salt or salts to improve the efficiency and effectiveness of the at least one iron-based compound, iron salt or salts. Contemplated alkaline components comprise any suitable alkaline component, which is a component that has a pH higher than 7. In some embodiments, contemplated alkaline components have a pH higher than 8. In other embodiments, contemplated alkaline components have a pH higher than 9. In yet other embodiments, contemplated alkaline components have a pH higher than 10.

In some embodiments, a contemplated alkaline component comprises at least one oxide-based component, at least one carbonate-based component or at least one hydroxide-based component. In other embodiments, a contemplated alkaline component comprises magnesium oxide, magnesium hydroxide, sodium hydroxide, calcium carbonate, calcium hydroxide, ammonium hydroxide, sodium hypochlorite, combinations thereof, salts thereof or combinations of salts thereof.

In other embodiments, calcium nitrate may be added in an effective amount to the iron-based compound composition and/or to the iron salt/salts/alkaline component(s) composition in order to increase the efficiency and effectiveness of all of the components as needed. However, as mentioned earlier, the basis of the contemplated compositions is the use of at least one iron-based compound, such as an iron salt or combination of iron salts.

U.S. Pat. No. 6,773,604 discloses the combination of iron salts with hydrogen peroxide, a weak acid that has a pH of 6.2. The inventors state that while iron salts and hydrogen peroxide have been used individually to control $H_2S$ emissions in wastewater treatment, both have shortcomings. However, when used in combination, the hydrogen peroxide operates as a driver of a catalytic cycle that hydrogen sulfide is converted into elemental sulfur through the reaction of hydrogen sulfide with elemental iron to form iron sulfide. This patent, however, discloses a very specific combination of constituents and do not contemplate the use of alkaline components in combination with an iron salt or iron salts to control odor-causing materials in sewage or wastewater.

In contemplated embodiments, compositions disclosed herein are designed to reduce vapor phase hydrogen sulfide to less than about 50 parts per million and in many instances to less than 25 parts per million or 25 ppm. In some embodiments, vapor phase hydrogen sulfide is reduced to less than about 20 ppm. In other embodiments, vapor phase hydrogen sulfide is reduced to less than about 15 ppm. In yet other embodiments, vapor phase hydrogen sulfide is reduced to less than about 10 ppm. In some other embodiments, vapor phase hydrogen sulfide is reduced to less than about 5 ppm.

In contemplated embodiments, compositions disclosed herein are designed to reduce liquid phase dissolved sulfide concentrations to about 1 mg/L and in many instances to about 0.5 mg/L. In some embodiments, liquid phase dissolved sulfide concentrations are reduced to about 0.4 mg/L. In other embodiments, liquid phase dissolved sulfide concentrations are reduced to about 0.3 mg/L. In yet other embodiments, liquid phase dissolved sulfide concentrations are reduced to about 0.2 mg/L. In some other embodiments, liquid phase dissolved sulfide concentrations are reduced to about 0.1 mg/L.

One of ordinary skill in the art will understand that the percentages of individual components contemplated herein will depend on the sewage and/or wastewater being treated and the odor-causing components being considered for control and reduction. Examples 1 and 2, as outlined in significant detail herein, show examples of how these components are utilized in a large sewage and wastewater treatment facility in Orange County, Calif.

EXAMPLES

The Orange County Sanitation District (OCSD) is a regional wastewater agency serving 2.5 million people in central and north Orange County, Calif. It was formed in 1946 under the County Sanitation District Act. OCSD is responsible for safely collecting, treating and disposing of the wastewater by operating and maintaining two regional wastewater treatment plants. Most of the 210 million gallons per day (mgd) of influent comes from within the service area. Eighty percent is from residential sources and 20 percent from commercial and industrial sources. The service area is divided into 11 sewer sheds. All wastewater is treated at one of the two 100-acre treatment plants: Reclamation Plant No. 1 in Fountain Valley, and Treatment Plant No. 2 in Huntington Beach. Most influent reaches the plants by gravity flow, but there are 15 off-site pump stations as well.

In addition to the plants, OCSD is responsible for 579 miles of collection system sewers and 2 on-plant pump stations. All of the facilities serve the residential, commercial and industrial wastewater needs of 21 cities, three special districts and portions of unincorporated Orange County in a 480 square mile service area comprising most of North and Central Orange County. Continuous and effective operation of OCSD's facilities is critical to the health and safety of Orange County citizens and the local environment.

Through agreement with the Santa Ana Watershed Protection Authority (SAWPA), OCSD receives desalter concentrate (brine), and industrial and domestic wastewater from the upper Santa Ana River Basin through the Santa Ana River Interceptor (SAR1) line. The SAR1 line also conveys flows from 250,000 residents from within the OCSD service area. Through agreement with the Irvine Ranch Water District (IRWD), IRWD operates OCSD Revenue Area 14.

OCSD receives wastewater from eastern portions of service area, and sludge from the IRWD Michelson Water Reclamation Plant. OCSD receives some flow from portions of Los Angeles County near the border of the service area. Some portions of the OCSD service area travel to Los Angeles County.

Example 1: Chemical Optimization for Control of Odor-Causing Components in Sewage and/or Wastewater OCSD provides continuous dosing in four of its eleven trunklines. In addition, OCSD batch doses caustic soda intermittently on its other seven trunklines. All eleven trunklines and current treatment are listed in Table 1.

TABLE 1

Trunk Sewer Treatment

| Sewer Trunk | Treatment Method | Mode |
| --- | --- | --- |
| Miller Holder | Ferrous Chloride | Continuous Dosing |
| Baker-Main | Ferrous Chloride | Continuous Dosing |
| Newport | Calcium Nitrate | Continuous Dosing |
| Knott | Magnesium Hydroxide | Continuous Dosing |
| Euclid | Sodium Hydroxide | Shock Dosing |
| Santa Ana | Sodium Hydroxide | Shock Dosing |
| Bushard | Sodium Hydroxide | Shock Dosing |
| Newhope | Sodium Hydroxide | Shock Dosing |
| SARI | Sodium Hydroxide | Shock Dosing |
| Sunflower | Sodium Hydroxide | Shock Dosing |
| Coast | Sodium Hydroxide | Shock Dosing |

Treatment in the regional trunks provides a secondary benefit of reducing hydrogen sulfide and odors entering the treatment plants. Newly designed capital projects at the treatment plants have been designed based upon treatment in the regional trunks to control vapor phase hydrogen sulfide to 25 parts per million (ppm) or less, based upon average daily values. This has reduced the size and scope of odor control system requirements at the treatment plants.

The wastewater characteristics and flow profile in any given trunkline are continuously changing due in part to water conservation measures, drought conditions, diversions to increase flow for the groundwater replenishment system, a reduction in industrial dischargers in the service area, and complexities of the sewer shed. In addition to changing wastewater conditions, the odors and hydrogen sulfide generation has also changed. Reassessment of the trunk conditions provides valuable feedback on the effectiveness of treatment.

Liquid phase odor control in the collection system provides considerable benefits to reducing odor and corrosion in the regional trunk system and suppresses odors upon arrival at the headworks of the treatment plant. OCSD has utilized at various times ferrous chloride, Peroxide Regenerated Iron for Sulfide Control (PRI-SC), magnesium hydroxide, and calcium nitrate at eight different dosing locations for continuous chemical odor control. Sodium hydroxide is also utilized for liquid phase odor control as needed by dosing directly into manholes. With recent upward trends in chemical unit prices, increasing fuel costs for bulk tanker deliveries, and the economic downturn, staff refocused efforts to reduce costs and optimize treatment.

The Odor and Corrosion Control Program at OCSD serves to minimize regional collection system odors in the communities served, extend the useful life of the regional collection system by reducing corrosion, and optimize/integrate the odor control program in the collection system with the two treatment plants, which is achieved through specific targets of:

Controlling vapor phase hydrogen sulfide to less than about 25 parts per million (ppm) at the designated points in the collection system up to the treatment plants based upon daily averages.

Controlling liquid phase dissolved sulfide concentrations to about 0.5 mg/L at designated points in the collection system up to the treatment plants.

Minimizing vapor phase odor volatile organic compound generation/release from the sewers.

These targets were initially developed through an odor control master planning process utilizing field testing and modeling. The program also aims to:

Develop possible chemicals, combinations of chemicals, or other tools for treatment to achieve control points.

Support an active capital improvement program which include significant construction and rehabilitation as well as a corrosion condition assessment program for wastewater collection systems.

Enable advanced controlling and monitoring technologies used including wireless and remote approaches developed for applicability to wastewater collection sewers.

Odor and corrosion control methods are continuously being developed and improved upon. For this reason, OCSD staff monitors industry best practices, evaluates the cost effectiveness of new methods and technologies, and conducts site-specific field trials for the odor and corrosion control program based upon changing flows and wastewater characteristics in OCSD's trunk sewer system.

Bulk Chemical QA/QC

Although OCSD had quality assurance provisions in bulk chemical specifications, they were typically relied upon only if a problem occurred. On a few occasions, the amount of solids present in the bulk chemical impacted the operation of the pumps, plugged filters and necessitated more frequent draining and cleaning of the tank. On another occasion, a treatment plant process problem occurred, and performance changed as a result of bulk chemical concentration for sodium hypochlorite. It was apparent that quality assurance and quality control (QA/QC) needed to be more proactive with all bulk chemicals. Staff began regularly collecting and holding samples from the collection system odor control dosing program and analyzed them periodically. If a problem was encountered with a batch, then the sample would also be analyzed. The specifications were also reviewed and updated, and a baseline analysis was conducted for the bulk chemicals.

Increased sampling also served to validate product charges. Since the pricing was based upon the concentration of iron for ferrous chloride, assurance was needed that the delivered product was the same as stated on the bill of lading. This involved securing a sample storage location, support for in-house analysis as well as a contract for external analyses. It was important to reach agreement on the method of analysis. In some cases, OCSD did not have the capability to perform the necessary analyses, and in other cases an independent third party analysis was desired as the payment was based upon the analyses. The end result was higher and more consistent product quality, which led to lower dose rates as less chemical was required to achieve the same result. In addition, system up-time was improved since equipment impurities were reduced.

Market Evaluation

OCSD began to experience challenges to the odor control program as well as treatment plant chemicals due to supply and pricing. In addition to dramatic and frequent price changes, chemical supply had been impacted by severe weather and road and rail closures.

Upon reviewing *Supply of Critical Drinking Water and Wastewater Treatment Chemicals—A White Paper for Understanding Recent Chemical Price Increases and Shortages* #4225, published by the Water Research Foundation (WRF) in 2009 and participating in a webinar of the same title, OCSD decided to embark on a similar evaluation, specific to OCSD's situation. The WRF (2009) report included the water and wastewater treatment fields, so it covered many chemicals that OCSD did not use, and did not include many that OCSD relied upon. These wastewater treatment chemicals play a critical role in protecting public health and the environment. OCSD and similar water and wastewater treatment agencies have experienced price increases and chemical shortages in recent years.

The goal of the project was to review OCSD's chemical use and develop systems or modify current systems to enable sustainable operations. The project focused on OCSD, the chemicals currently used in the treatment plants and collection system, viable alternatives to those chemicals, storage technologies, and a mitigation plan for short outages, longer-term delays, or stoppages in chemicals.

Objectives of this project included identifying possible providers or options in both a growth economy and during a recessionary economy, possible purchase agreements with current or new bulk chemical suppliers, alternate but viable bulk chemical suppliers, and new storage technologies for chemicals used in wastewater collection systems and wastewater treatment plants. Additionally, the evaluation served to explore alternate emergency supplies of current OCSD chemicals elsewhere in the U.S. or outside of the U.S., public-private partnerships domestically, temporary suppliers, new chemicals or replacement chemicals, and the impact of possible tightening of regulatory limitations that may drive tighter specifications in terms of trace materials in the bulk chemicals. The chemical market analysis allows OCSD to be cognizant of options and better prepared for challenges of the future.

OCSD maintains a matrix of preferred, possible, and contingency chemicals for each dosing location. These are determined based upon site-specific conditions such as environmentally sensitive areas, force main or gravity sewer, past testing, and operational experience. Preferred chemicals are presented in Table 2.

TABLE 2

Preferred Chemicals

| Sewer Trunk | Chemical Options |
| --- | --- |
| Miller-Holder, Upper | Ferrous Chloride |
| Miller-Holder, Lower | Calcium Nitrate |
|  | Ferrous Chloride |
|  | Hydrogen Peroxide (27%) |
|  | Magnesium Hydroxide |
| Baker-Main, Upper | Ferrous Chloride |
|  | Calcium Nitrate |
|  | Magnesium Hydroxide |
| Baker-Main, Lower | Calcium Nitrate |
|  | HydrogenPeroxide (27%) |
|  | Ferrous Chloride |
|  | Magnesium Hydroxide |
| Knott Interceptor, Upper | Magnesium Hydroxide |
|  | Calcium Nitrate |
|  | Ferrous Chloride |
| Knott Interceptor, Lower | Magnesium Hydroxide |
|  | Calcium Nitrate |
|  | Ferrous Chloride |
| Newport, Upper | Calcium Nitrate |

Each standard storage and dosing system design consists of the following key elements:
Tank system
Chemical transfer system
Monitor/Controller
Dosing system sized for the targeted feed rate
Site containment system
Safety shower/eyewash station A direct interactive user interface and control system for OCSD staff is utilized via a dedicated internet website. The user interface allows OCSD staff to directly download daily inventory and diagnostic data reports on each site as well as control and monitor chemical feed rates if needed.

The system allows OCSD staff to enter a 24-point hourly curve for each day of the week as the dosing profile. These points are interpolated by the PLC and the resulting smooth curve is the dose that is delivered to the system via the dosing pumps. This dosing curve is determined on a site-by-site basis based upon flow and confirmation of results through sampling and analysis.

Monitoring each dosing site ensures reliable chemical supply and deliveries according to dose rate variations or site outages. System performance, alarms, and variances that would require follow-up are regularly monitored. These types of situations include chemical spill/releases, power failure, and greater than 10% variance off target dose rates.

Reporting and Documentation

Weekly, monthly, and annual reports are prepared and reviewed. Information in the reports include system status reporting date, time, duration, explanation of any feed rate variance greater than 10% from hourly target feed rate, average daily feed rate, target feed rate, actual feed rate, and approximate tank level, graphic representations of the aqueous sulfide and hydrogen sulfide levels at monitoring locations on a daily basis throughout the reporting period with a summary of the target levels and whether they were met. The report also provides the results of all grab samples taken during the month with a discussion of changes. The reports provide descriptions of system performance, chemical usage, key observations, and any interruptions or problems in service, as well as information on seasonal trends in both hydrogen sulfide and chemical feed and detailed recommendations for changes in the dosing rate at each chemical application point.

Performance Monitoring/Field Sampling

TABLE 3 lists the minimum monitoring requirements.

| Analyses | Frequency |
| --- | --- |
| Total and Dissolved Sulfide, pH, Temperature | 18-24 weekly grab samples |
| Vapor H2S | 24-hour continuous data logging year around |
| Residual nitrate mg/L Total Nitrate - Nitrogen (as needed) | 18-24 weekly grab samples |
| Vapor H2S | 24-hour continuous data logging year around |
| Nitrate, nitrogen | As needed on lines with calcium nitrate treatment |

Testing of New Chemicals and Product Comparisons

As wastewater conditions change, chemical prices fluctuate, or new treatment methods become available, OCSD has conducted chemical comparison tests. In the past, OCSD has conducted many product comparisons to ensure that the lowest cost and best suited treatment is utilized.

As a result of the comparison testing, many changes were made to the chemicals dosed in the OCSD sewer system. Since the chemical supplier provides the dosing equipment, and they are not permanent installations, the dosing program can be dynamic in responding to changing conditions.

As resources allow, trunkline conditions are reassessed for baseline conditions including flow, vapor phase hydrogen sulfide, liquid phase dissolved sulfides, dissolved oxygen, volatile organic compounds, and odor. Ideally, the trunkline would be assessed during different seasons to obtain a warm weather and cool weather baseline. If a baseline had not been conducted recently on a trunk, this would be done prior to product testing. In some cases, this is difficult as strong odors may be generated resulting in significant odor complaints. The baseline evaluation includes diurnal sampling for a 2 week period.

Following the baseline, one of the chemicals is injected with support from the respective vendor/supplier to adjust and optimize the dosing to meet the test objectives. Then the next chemical is tested for the following period of 30 days. The initial 15 day period is typically used for adjusting and optimizing so the product evaluation, in terms of meeting the control objectives, is during the final 15 days. It is in the suppliers' best interest to obtain the lowest dosage possible since cost for treatment is critical in the overall evaluation. Additional parameters that are evaluated include consistency in meeting the targets, odor, reduced sulfur compounds, and volatile organic compounds. The next product is then given a 30 day window for testing. The tests are scheduled so dramatic changes in temperatures or conditions are not present during the test period, but this is not always practical.

Results and Discussion

Three field tests will be reviewed including the following:
Ferrous chloride vs. magnesium hydroxide
Calcium nitrate vs. magnesium hydroxide
Magnesium hydroxide followed by ferrous chloride Chemicals Considered: Basis of Control Ferrous chloride reduces odors by precipitating dissolved sulfide as ferrous sulfide. The effectiveness is highly dependent on pH. A pH below 7 will provide only 40% efficiency; whereas a pH at or near 8 will yield nearly complete precipitation (Nielsen, Hvitved-Jacobsen, and Vollertsen, 2008).

Figure 1:
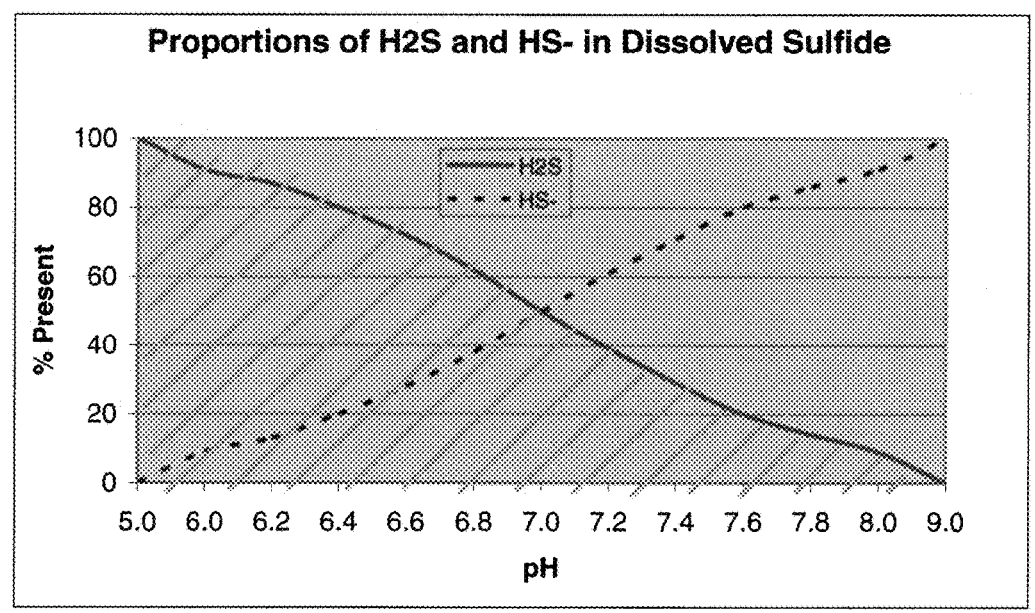
FIG. 1 presents the forms of hydrogen sulfide at varying pH values. With the presence of magnesium, soluble salts are produced.

Magnesium hydroxide elevates the pH of the wastewater. This results in shifting of the proportions of hydrogen sulfide from the gaseous phase (H2S) to the dissolved phase (HS−). FIG. 1 presents the forms of hydrogen sulfide at varying pH values. With the presence of magnesium, soluble salts are produced. Since pH is a logarithmic function, performance is best when only a small amount of hydrogen sulfide needs reducing.

Calcium nitrate intervenes with biological processes by providing nitrate as a source of food for bacteria. They may dominate the slime layer and consume sulfide that is still generated. (Apgar, Witherspoon, Easter, et. al, 2007).

Test of Ferrous Chloride and Magnesium Hydroxide on the Miller Holder Sewer

The objective of this evaluation was to compare the cost and performance of ferrous chloride to magnesium hydroxide in terms of: 1) controlling vapor hydrogen sulfide levels within the sewer to less than about 25 ppm, daily average, 2) lowering the levels of more complex (non-H2S) odors; and 3) minimizing adverse impacts at the treatment plant. Chemicals tested were ferrous chloride (FeCl2, 32-36% w/w solution) and magnesium hydroxide (Mg(OH)2, 63% slurry, Thioguard®).

System Description

The Miller-Holder trunk is a low-velocity gravity sewer for its approximately 25-mile length, beginning in La Habra. Table 4 below presents the characteristics of this trunk system. The downstream location, and at the last control point prior to Plant No. 2, has approximately 11-12 hours of travel time from the dosing location.

TABLE 4

Miller-Holder Trunk Characteristics

| Sewer Trunk System | Length (miles from plant) | Avg. Daily Flow at dosing site (MGD) | Avg. Daily Flow at plant (MGD) | Sulfide Mass Loading (lb./MG) | Approx. pH range at the test site |
|---|---|---|---|---|---|
| Miller-Holder | 25 | Approx. 4 | 21 | 35 | 7.0-8.0 |

Results and Analysis

Dosage, cost, and hydrogen sulfide levels for the Miller Holder trunkline study are presented in Table 5.

TABLE 5

Performance Summary for the Miller Holder Field Test

| Treatment | Average H2S levels, ppm | | | Chemical Use gpd | Ave. Liquid Temp, F. | Unit Feed Rate | Cost $/day |
|---|---|---|---|---|---|---|---|
| | Loc. 1 | Loc. 2 | Loc. 3 | | | | |
| Ferrous Chloride | 12 | 11 | 21 | 2,340 | 73.4 | 3.07 lb-Fe/lb-S | $2,780 |
| Magnesium Hydroxide | 26 | 30 | 39 | 2,478 | 75.6 | 112 gal/MG | $4,385 |

OCSD had previously used ferrous chloride, and the comparison test confirmed that the more effective of the two chemicals was being used for this application.

Each of the chemicals was dosed 21 miles upstream of the treatment plant and the effects were monitored at three locations downstream. The results show that magnesium hydroxide was unable to consistently achieve the criteria of less than 25 ppm of hydrogen sulfide. Ferrous chloride was able to control to less than 25 ppm of hydrogen sulfide on 22 of 22 test days; whereas magnesium hydroxide was only able to reduce hydrogen sulfide to the control point on 5 of 22 days. Ferrous chloride provided a 98.5% reduction of hydrogen sulfide at a cost of only 63% of magnesium hydroxide. Magnesium hydroxide reduced hydrogen sulfide by 95% and was not able to hold down the hydrogen sulfide and methyl mercaptan components of the test as well as ferrous chloride.

The olfactory analysis provides a broader picture of odors rather than just hydrogen sulfide. Odor panel analyses showed higher levels of odors with the ferrous chloride treatment as opposed to the magnesium hydroxide treatment. The descriptors used to describe the air samples were offensive, chemical, earthy and fishy. Odor data are presented in Tables 6 and 7.

TABLE 6

Olfactory Analysis for Headspace Air While Dosing Ferrous Chloride

| Downstream Location | Sample No. | ASTM E679 & EN13725 | | ASTM E544 Intensity | Characterization | |
|---|---|---|---|---|---|---|
| | | Detection Threshold | Recognition Threshold | | Hedonic Tone | Principal Descriptors |
| 1 | 1 | 11,000 | 6,000 | 70 | −3.6 | Offensive, Chemical, Earthy, Fishy |

TABLE 6-continued

Olfactory Analysis for Headspace Air While Dosing Ferrous Chloride

| Downstream Location | Sample No. | ASTM E679 & EN13725 | | ASTM E544 Intensity | Characterization | |
|---|---|---|---|---|---|---|
| | | Detection Threshold | Recognition Threshold | | Hedonic Tone | Principal Descriptors |
| 1 | 2 | 17,000 | 8,500 | — | — | — |
| 2 | 1 | 11,000 | 5,200 | 40 | −3.2 | Offensive, Chemical, Fishy |
| 2 | 2 | 19,000 | 10,000 | — | — | — |
| 3 | 1 | 14,000 | 7,400 | 45 | −4.4 | Offensive, Chemical, Earthy |
| 3 | 2 | 12,000 | 6,400 | — | — | — |

TABLE 7

Olfactory Analysis for Headspace Air While Dosing Magnesium Hydroxide

| Downstream Location | Sample No. | ASTM E679 & EN13725 | | ASTM E544 Intensity | Characterization | |
|---|---|---|---|---|---|---|
| | | Detection Threshold | Recognition Threshold | | Hedonic Tone | Principal Descriptors |
| 1 | 1 | 4,000 | 2,400 | 25 | −3.2 | Offensive, Earthy |
| 1 | 2 | 4,200 | 3,000 | — | — | — |
| 2 | 1 | 4,000 | 2,600 | 19 | −2.8 | Offensive, Chemical |
| 2 | 2 | 4,500 | 3,000 | — | — | — |
| 3 | 1 | | | Bag split in transit | | |
| 3 | 2 | 4,000 | 2,600 | 30 | −3.2 | Offensive, Chemical, Earthy |

The potential for volatilization of hydrogen sulfide from the wastewater into the sewer vapor is pH dependent. The lower the pH, the more likely hydrogen sulfide will volatilize and cause nuisance odors. During the test period with magnesium hydroxide, several pH dips occurred. Specifically, ten over a six-day period were observed and are shown in FIG. 2. Even though many of the decreases were only 0.5 pH units, the impact on vapor hydrogen sulfide was immediate and significant. The cause of these pH shifts is unknown, but would impact ferrous chloride treatment as well.

The reduction of organic sulfur compounds was similar with both treatment approaches. In addition, the plant impact was measured in terms of sulfide levels in the Miller-Holder influent sewer. Total and dissolved sulfide levels over a 24-hour period averaged 1.6 mg/L and 0.1 mg/L for ferrous chloride. Grab samples for magnesium hydroxide indicated levels of approximately 3.5 mg/L and 2.3 mg/L, respectively.

The conclusion of this study is that ferrous chloride is the more cost-effective treatment alternative for the Miller-Holder trunk, based on the initial criteria of the hydrogen sulfide objective of less than 25 ppm in the vapor phase. If overall odors were taken into consideration, and the full plant impact (i.e. biosolids hauling), the two approaches may be comparable.

Test of Calcium Nitrate vs. Magnesium Hydroxide on the Newport Trunk

The objective of this test was to compare the cost and performance of standard Calcium Nitrate (Ca(NO3)2, Bioxide®)) to Magnesium Hydroxide (Mg(OH)2, 63% slurry, Thioguard®) in terms of: 1) controlling vapor H$_2$S levels within the Newport sewer to less than 25 ppm, daily average, and 2) minimizing adverse impacts at the treatment plant with respect to sulfide loading from the collection and oxidant demand.

System Description

The Newport sewer consists of a force main sewer for a 6-mile length, beginning in Newport Beach at Bay Bridge Pump Station. Historically, magnesium hydroxide was used since 2002 at the Bay Bridge Pump Station to treat vapor hydrogen sulfide from the force main to the inlet and outlet of the siphon before entire to Plant No. 2. Just prior to the siphon, is an oil field discharger, which could contribute intermittent and variable sulfides. This may have contributed to the results. Saltwater intrusion may occur along this coastal sewer; however, this study did not consider the impacts of increased sulfide in the system due to saltwater intrusion. The condition would have been present and impacting both chemical tests.

Results and Analysis

Total sulfide levels entering Plant No. 2 on this sewer over a 24-hour period averaged 0.4 mg/L during calcium nitrate treatment. Grab samples for magnesium hydroxide were an order of magnitude higher, or 4.0 mg/L sulfides. At a wastewater flow of 15 mgd, this represents a difference in loading of 450 lbs of sulfide per day. FIGS. 5 and 6 present the hydrogen sulfide data at the inlet and outlet of the siphon.

The results show that calcium nitrate was able to achieve the treatment goal at both the inlet and outlet of the siphon 12 of 15 days, as compared to magnesium hydroxide, which met the treatment goal at the inlet of the siphon only 11 of 22 days and was not able to meet the goal at the outlet of the siphon at any point during the study. Once the optimum feed rate profile was achieved for calcium nitrate, compliance the control criteria was achieved 100% of the time. Calcium nitrate was able to meet the objectives in a more reliable and cost-effective manner for the Newport sewer application.
Test of Magnesium Hydroxide Followed by Ferrous Chloride on the Knott Trunk Each of OCSD's trunkline systems have unique characteristics in terms of flow and sulfide loading contribution, therefore, optimum odor control technology selection has to take these differences, as well as operational concerns, into account when assessing overall performance and cost effectiveness. Whereas in some cases a single chemical and dosing location may be the most cost effective approach, whereas in other systems a multi chemical approach may be necessary to achieve the performance criteria in a cost effective manner. The Knott system falls in the latter category. OCSD's previous treatment approaches have demonstrated the infeasibility of using a single chemical on the Knott system through the cost and inconsistent control at the lower sample points.

The objective of this test was to try a new approach to odor control by elevating the pH of the wastewater prior to ferrous chloride addition. The target pH range was 7.5 to 8.0. The treatment objective was less than 25 ppm vapor hydrogen sulfide. Bench scale work showed improved efficiency of iron with a pH at or near 8 (Nielsen, Hvitved-Jacobsen, and Vollertsen, 2008).

Benefits of this new approach could be:
Better sulfide control at the same iron dose.
Less total iron concentration is required to achieve the same control which would reduce Fe costs and solids loading to the plant.
Control of other odors besides hydrogen sulfide would be gained through the addition of magnesium hydroxide.

System Description

The Knott Trunk has an upper portion that is untreated. Continuous dosing occurs at a pump station, and the force main and interceptor extend approximately four miles before it joins with the Knott Trunk Sewer System. From this point, the Knott Trunk Sewer System extends another ten miles prior to joining with the interplant line and then flows for approximately five miles before discharging to OCSD Plant No. 2.

Results and Analysis

Initial results show consistency in achieving the vapor phase criteria of less than 25 ppm hydrogen sulfide at the downstream control point with the use of magnesium hydroxide followed by ferrous chloride on the Knott Sewer. Results are presented in Table 8.

TABLE 8

Summary of Assessment Results

| | Chemical Feed | | Control Point Period | |
|---|---|---|---|---|
| Test Period | Rates, gpd Magnesium Hydroxide | Rates, gpd Ferrous Chloride | Average Vapor H2S ppm | Chemical Cost $ per day |
| 1 | 3441 | 0 | 47 | $6,413 |
| 2 | 1873 | 1172 | 5 | $5,693 |

Vapor phase hydrogen sulfide ranged from 3-35 ppm (average: 15 ppm) with liquid dissolved grab ranging from less than 0.1 to 0.5 mg/L.

Overall cost for treatment using magnesium hydroxide and ferrous chloride show a significant cost savings, based on current pricing.

Example 2: Iron-Based Compounds and Alkaline Components

Orange County Sanitation District (OCSD) has experienced significant cost increases and short-term supply limits due to chemical price increases and sustainability concerns. OCSD continues to diversify and improve odor control performance within its collection system. Due to volatile iron prices, OCSD's objective is to reduce future iron usage. OCSD has previously reported on methods used to continually optimize the odor control program in the collection system using both administrative measures and results of full-scale field tests; however, little data was available at the time on cost-performance benefits of ferrous chloride in combination with magnesium hydroxide.

OCSD conducted a field trial that resulted in a full-scale proof of concept. OCSD used a novel treatment approach that integrated a combination treatment of ferrous chloride with magnesium hydroxide in a synergistic manner that allowed iron to be added efficiently to improve cost-performance.

OCSD's collection system odor control program currently utilizes two chemicals more than others, magnesium hydroxide and ferrous chloride. Ferrous chloride is a great asset in combating hydrogen sulfide gas but not for the broad spectrum of malodorous compounds. Magnesium hydroxide reduces a broad range of malodorous compounds, but under typical circumstances, it has a maximum reduction potential for hydrogen sulfide gas of 90% to 95% (as compared to no treatment), and sometimes the remaining 5% to 10% exceeds OCSD's established treatment parameters. OCSD seeks to reduce overall hydrogen sulfide and malodorous compounds with less chemical usage and therefore less money per million gallons of flow treated. OCSD also has found wide variations in ferrous chloride performance, and poor efficiencies were observed with increasing $Fe^{2+}$ ratios; practical dose ratios are typically about 200% or more of the theoretical requirement, which is 1.7 lbs Fe (or 3.7 lbs $FeCl_2$) per lb-Sulfide. OCSD found a need to utilize the best characteristics of these two chemistries synergistically.

Since ferrous chloride (iron) is a commodity in great demand by emerging markets around the world, it is forecasted to increase significantly in the coming years. A key component of this effort was to demonstrate the cost-performance of using ferrous chloride in combination with magnesium hydroxide.

History of Treatment on the Knott Trunk

The Knott Trunk has an upper portion that historically has not been treated on a continuous basis. As needed to mitigate high $H_2S$ levels on this upper portion, caustic shock dosing has been used to remove the slime layer. On the lower portion of the trunk, chemicals are dosed continuously at a pump station through a force main and interceptor approximately four miles upstream of the Knott Trunk Sewer System. After the merger of the two segments, a second dosing station allows for more chemical addition. The Knott Trunk Sewer System extends ten more miles prior to joining with the interplant line and then flows for approximately five miles before reaching Plant No. 2. In addition, there is a junction structure that allows the flow to be diverted during part of the day to Reclamation Plant No. 1 to enable a greater amount of water to be reused.

Project Objectives

The objective is to prove the concept underlying the Alkaline-Enhanced Iron (AE-Fe) technology. Laboratory scale demonstrates that by elevating the pH of the wastewater to or near 8.0, the yield/efficiency of the precipitation reaction that forms FeS is beneficial compared to $FeCl_2$ alone. Some of the benefits include better sulfide control performance at the same level of Fe dosing (i.e. lower target sulfide concentrations reached in liquid and vapor), and less total (excess) Fe concentration to achieve the same level of control, which would reduce Fe costs and possibly solids loading to the plant. Profile dose-response efficiency of $FeCl_2$ and $Mg(OH)_2$ feed rates to sulfide control, targeting levels of less than about 0.5 mg/L dissolved sulfide and less than about 25 ppm vapor $H_2S$.

Project and Technology Description

This project was designed to prove the underlying technical and performance efficacies of this concept within the Knott Trunk Sewer System. It tested various feed rate combinations of $Mg(OH)_2$ and $FeCl_2$ to affect pH and Fe concentrations, respectively. It also measured the dose-response sulfide control impacts in the liquid and vapor at the designated control points. The process entails adding $Mg(OH)_2$ at the upper reach of the Knott Trunk Sewer System and $FeCl_2$ at the lower reaches intermediate to the treatment plants.

Basis of Control

This study relies on properties of ferrous chloride and magnesium hydroxide to react with wastewater.

The AE-Fe Technology

The AE-Fe technology is based on the conventional ferrous iron reaction in wastewater, which relies on the ability of dissolved sulfide ($H_2S$ and HS−) to form insoluble iron sulfides (e.g., FeS), which prevents the emission of gaseous phase hydrogen sulfide [$H_2S$ (g)] into the sewer atmosphere. The underlying chemical reaction is:

$$Fe^{2+}+H_2S<=>FeS+2H^+ \quad (1)$$

It follows from this reaction that increasing the concentration of H+ (i.e., lowering the pH) will drive the reaction to the left, increasing the concentrations of free $Fe^{2+}$ and $H_2S$. By reducing the concentration of $H^+$ (i.e., raising the pH), the AE-Fe technology does the opposite: drives the reaction to the right reducing the $Fe^{2+}$ and $H_2S$. The effectiveness is dependent on the pH. A pH below 7 will provide only 40% efficiency; whereas, a pH at or near 8 will yield nearly complete precipitation (Nielsen, Hvitved-Jacobsen, and Vollertsen, 2008).

FIG. 1 (as discussed earlier) shows the speciation of sulfide at various pH values. As the pH increases, sulfide dissociates and drives both equations (1) and (2) to the right. This results in further lowering the concentration of volatile $H_2S$.

$$H_2S<=>HS-+H+ \quad (2)$$

The mechanisms outlined above are accurate; however, many intermediary reactions may occur including:

$$FeCl_2+Mg(OH)_2<=>Fe(OH)_2+MgCl_2 \quad (3)$$

$$Fe(OH)_2+H_2S<=>FeS+2HOH \quad (4)$$

The formation of metal hydroxide/oxide suspended precipitates lends itself to improved adsorption and reaction. The pH of wastewater is increased by the addition of magnesium hydroxide resulting in a shift of the proportion of hydrogen sulfide from the gaseous phase ($H_2S$) to the dissolved phase (HS−).

With the presence of magnesium, soluble salts are produced. Since pH is a logarithmic function, performance is best when there is a small amount of hydrogen sulfide. When utilizing magnesium hydroxide to achieve a pH of about 8.6 to 9, the activity of methanogens may be reduced resulting in less methane and hydrogen sulfide formation. The suppressed microbial activity may last for period even after the pH is decreased (Gutierrez, Park, Sharma, & Yuan). This would provide even further benefit from increasing the pH in the AE-Fe process. Zhang et al. (2008) summarize prior work related to iron precipitation in wastewater. In practice, it was found that a mix of $Fe^{2+}$ and $Fe^{3+}$ was more efficient than either alone and the theoretical addition of iron underestimates the demand to control dissolved sulfide in wastewater. Modeling efforts showed an inverse relationship between pH and the molar relationship of $Fe^{2+}$ to $S^{2-}$ to achieve a dissolved sulfide reduction (Firer, Friedler, & Lahau, 2008). This is further support for performing a full scale field investigation of iron treatment at an increased pH.

Methodology

Results of the full-scale field tests are presented from the Knott Trunk Sewer System, which is one of the largest interceptor sewer systems that OCSD manages in terms of total flow and sulfide loading. The proof of concept field trial utilized a novel treatment approach that synergistically integrates a combination treatment of magnesium hydroxide followed by ferrous chloride allowing ferrous chloride to be added efficiently to improve cost-performance.

System Description

The portion of the Knott Trunk Sewer System tested is shown in FIG. 3. Magnesium hydroxide was added at the Seal Beach Pump Station (upstream boundary) and discharged via the force main then combined with gravity flows from the untreated upper Knott Trunk Sewer System. The FeCl2 dispensing site is located approximately halfway down the Knott Trunk Sewer System, in the Midway City Yard. From this point, the Knott Trunk Sewer System extends another ten miles further to OCSD treatment plant. Except for certain contributing flows from Seal Beach Pump Station force main, all flow is by gravity interceptor.

System Characteristics

The Knott Trunk Sewer System is the largest of twelve sewer systems OCSD oversees. The Knott portion under study begins at the Seal Beach PS with a three-mile forcemain before combining with gravity flows from the upper Knott. Because of this complex dynamic, the chemical dosing needs to have the ability to provide treatment for the sulfide loading from the upper portion of wastewater flow, as it increases (to approximately 60 mgd), before reaching the furthest downstream (control point) at Talbert and Magnolia. In July 2010, baseline sampling showed an untreated base loading of 1,452 lbs-sulfide per day at the lower reach (control point), with 967 lbs per day in the upper Knott, and 713 lbs per day in the forcemain discharge from Seal Beach. Table 9 presents the sewer, wastewater flow, and sulfide characteristics for the Knott Trunk Sewer System.

TABLE 9

Knott Trunk Sewer System Characteristics

| Sewer Trunk System | Length (miles) | Avg. Daily Flow (mgd) | Approx. pH range | Total (Aqueous) Sulfide Conc. (mg/L) | Total (Aqueous) Sulfide Mass Loading (lb/day) | Typical Vapor $H_2S$ (ppm) range |
|---|---|---|---|---|---|---|
| Knott Trunk Sewer | 14 | 60 | 6.7-7.2 | 2.5-3.5 | 1,452 | 300-700 |

Baseline Information

FIG. 4 presents the baseline sulfide levels (without chemical treatment) along the Knott Trunk Sewer System, and aqueous and vapor sulfide levels measured at the downstream control point Talbert and Magnolia.

Chemical Storage and Dosing System Description

Each chemical installation used in the study consisted of a chemical storage tank, a pump module, and secondary containment system. The pump module included a computer-controlled output with the hourly feed rates profiled to match sulfide loadings. Users were able to enter a 24-point hourly curve for each day of the week as the dosing profile.

The $FeCl_2$ was supplied as a 34-36% w/w $FeCl_2$ solution (1.7 lbs-Fe per gallon); whereas the $Mg(OH)_2$ was supplied as a 61-65% $Mg(OH)_2$ alkaline slurry solution.

Analytical Methods

Continuous vapor $H_2S$ monitoring and data logging was performed throughout the study at the Talbert and Magnolia control point in the Knott Trunk Sewer System. Liquid measurements were by periodic grab sampling, except for diurnal profiles which were twenty-four hour grab samples. Table 10 lists the constituents monitored and methods conducted during the testing.

TABLE 10

Analytical Methods

| Compound analyzed/ Constituent | Sample Analytical Method/Procedure |
| --- | --- |
| Total sulfide | Std. Methods 4500-S2-D. Methylene Blue |
| Dissolved sulfide | Std. Methods 4500-S2 using pre-flocculation to remove insoluble sulfides |
| Wastewater pH | portable meter (grabs and data logging) |
| Temperature | NIST calibrated thermometer |
| Vapor $H_2S$ | 24-hour continuous data logging year around |

Results

Overall costs for treatment using AE-Fe technology are presented in Table 11 and compared to $FeCl_2$-alone treatment The AE-Fe technology shows a significant cost saving based on current unit cost pricing.

TABLE 11

Summary of Results

| Technology | Chemicals | Average Chemical Usage (GPD) | Average Vapor H2S (ppm) | Average Fe Dose Ratio lbs-Fe per lb-S | Average Chemical Cost $/day |
| --- | --- | --- | --- | --- | --- |
| $FeCl_2$ Alone | $FeCl_2$ | 4050 | 20 | 4.9 | $ 9,181 |
| AE-Fe | $Mg(OH)_2$/ $FeCl_2$ | 1900/ 1459 | 15 | 1.8 | $ 6,901 |
| AE-Fe | $Mg(OH)_2$/ $FeCl_2$ | 1749/ 1278 | 19 | 1.5 | $ 6,204 |
| AE-Fe | $Mg(OH)_2$/ $FeCl_2$ | 2810/ 2083 | 13 | 2.5 | $10,036 |
| AE-Fe | $Mg(OH)_2$/ $FeCl_2$ | 2130/ 1616 | 19 | 1.9 | $ 7,691 |
| AE-Fe | $Mg(OH)_2$/ $FeCl_2$ | 1999/ 1609 | 19 | 1.9 | $ 7,428 |
| AE-Fe | $Mg(OH)_2$/ $FeCl_2$ | 1982/ 1520 | 12 | 1.8 | $ 7,193 |
| AE-Fe | $Mg(OH)_2$/ $FeCl_2$ | 2004/ 1352 | 15 | 1.6 | $ 6,856 |
| AE-Fe | $Mg(OH)_2$/ $FeCl_2$ | 2372/ 1185 | 15 | 1.4 | $ 7,172 |

FIG. 5 shows the baseline level of treatment provided by $FeCl_2$-alone, and the average dose for the period was 4,050 gpd. FIGS. 6-13 present data for various sampling periods during a continuous fifteen month period. These figures present the $FeCl_2$ and $Mg(OH)_2$ dosed per day, the resulting $H_2S$ in parts per million, and the cost for control. Supplementing the existing $Mg(OH)_2$ feed at the Seal Beach Pump Station with $FeCl_2$ feed from the Midway Corporation Yard is a cost-effective way to achieve consistent $H_2S$ control.

Benchmark Cost-Performance Target

It may prove helpful to express the results of this study in a form that may be readily compared to other situations, as presented in Table 12.

TABLE 12

Benchmark Cost-Performance Comparison

| Technology | Feed Rate (gpd) | Vapor $H_2S$ Reduction | Unit Feed Rate | Benchmark $ per lb-S controlled |
| --- | --- | --- | --- | --- |
| Ferrous chloride | 4,050 | 94.3% | 4.88 lbs-Fe per lb-S | $6.32 |
| AE-Fe | 1,185 gpd Fe | 95.7% | 1.43 lbs-Fe per lb-S | $5.36 |
|  | 2,372 gpd $Mg(OH)_2$ |  | 1.9 gal per lb-S |  |

Baseline assumptions:
1) Liquid sulfide loading = 1452 lbs-S per day
2) Vapor H2S average = 350 ppm Given the theoretical requirement is 1.7 lbs of Fe per lb of sulfide, OCSD's actual demand for ferrous chloride-only (during summer baseline period) was 4.88 lbs-Fe per lb-S, which represents about 2.9 times or 290% of the theoretical requirement.

The AE-Fe process was continually optimized and altered as the testing phase progressed. Since the ferrous chloride benchmark was conducted during summer months, additional testing and optimization will be conducted throughout summer 2011 to compare during similar temperatures.

The AE-Fe technology appears to be a useful tool to build resilience into OCSD's odor control program by providing the ability to shift along the iso-cost curve of practical feed rate combinations as price differences between the two chemicals change. Supplementing $Mg(OH)_2$ feed at the Seal Beach Pump Station with $FeCl_2$ feed at the Midway Corporation Yard is a cost-effective way to achieve consistent levels of less than about 0.5 mg/L dissolved sulfide and less than about 25 ppm vapor $H_2S$.

Thus, specific embodiments, methods of chemical optimization of wastewater treatment and odor control, including the uses thereof have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification and claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A composition for the use of wastewater treatment, odor control in water, sewage or wastewater or a combination thereof, wherein the composition consists of the combination of:

at least one iron-based compound, wherein the at least one iron-based compound is selected from the group consisting of ferrous chloride, ferric chloride, ferrous sulfate, ferrate, polyferric sulfate, Ferix-3 ($Fe_2(SO_4)3H_2O$) or a combination thereof;

at least one alkaline component; and calcium nitrate.

2. The composition of claim 1, wherein the alkaline component comprises at least one oxide-based component, at least one carboxide-based component, at least one hydroxide-based component, or a combination thereof; at least one salt thereof; or a combination of salts thereof.

3. The composition of claim 2, wherein the alkaline component comprises magnesium hydroxide, magnesium oxide, sodium hydroxide, sodium hypochlorite, or a combination thereof.

4. The composition of claim 1 for the use of wastewater treatment, odor control or a combination thereof, wherein the composition reduces vapor phase hydrogen sulfide to less than about 25 parts per million.

5. The composition of claim 1 for the use of wastewater treatment, odor control or a combination thereof, wherein the composition reduces liquid phase dissolved sulfide concentrations to about 0.5 mg/L.

6. A method of reducing the odors in a sewage or wastewater system, consisting of:

providing sewage or wastewater that is contained within a sewage or wastewater system; and adding a composition consisting of the combination of at least one iron-based compound to the sewage or wastewater system, wherein the at least one iron-based compound is selected from the group consisting of ferrous chloride, ferric chloride, ferrous sulfate, ferrate, polyferric sulfate, Ferix-3 ($Fe_2(SO_4)3H_2O$) or a combination thereof, calcium nitrate and at least one alkaline component in order to treat the sewage or wastewater.

7. The method of claim 6, wherein the composition can be added to the sewage or wastewater system in at least one point in the process.

8. The method of claim 6, wherein the composition can be added to the sewage or wastewater system in at least two points in the process.

9. The method of claim 6, wherein the alkaline component comprises at least one oxide-based component, at least one carboxide-based component, at least one hydroxide-based component, or a combination thereof; at least one salt thereof; or a combination of salts thereof.

* * * * *